April 10, 1934.                J. SCHADE                1,954,494
                           LOOSE LEAF BINDER
                        Filed Nov. 11, 1932        2 Sheets-Sheet 1
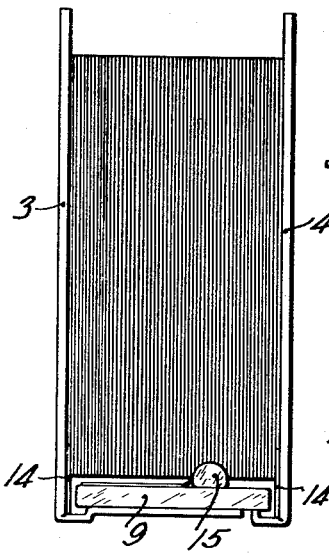
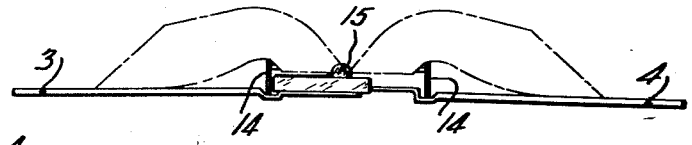
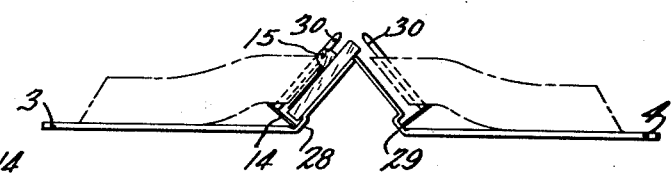
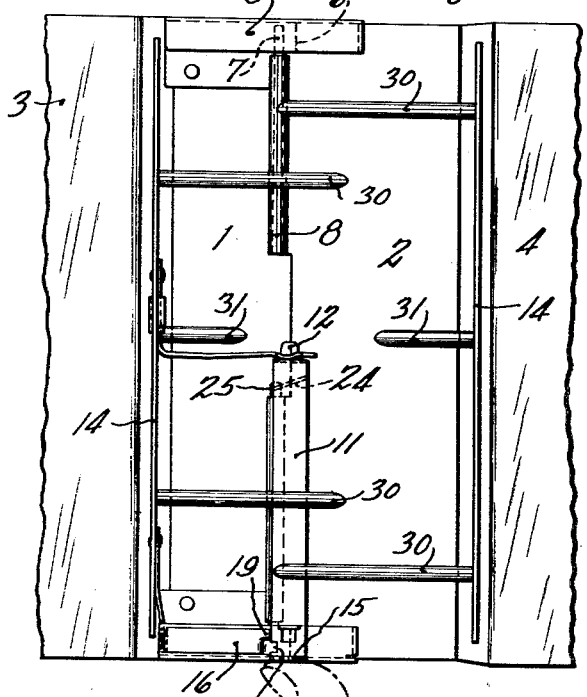
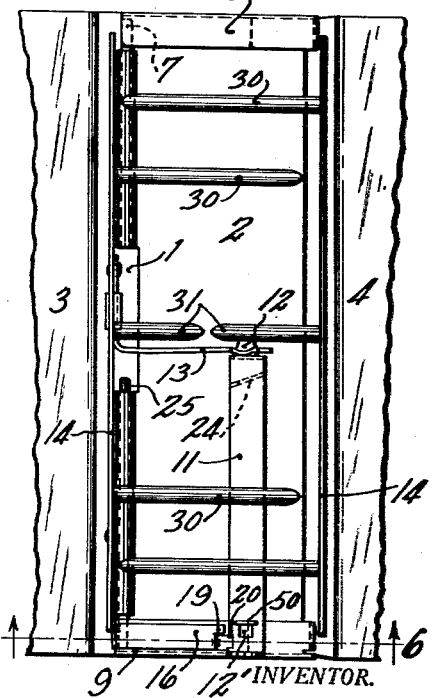
INVENTOR.
JOHN SCHADE
BY Chapin & Neal
ATTORNEYS.

April 10, 1934.     J. SCHADE     1,954,494
LOOSE LEAF BINDER
Filed Nov. 11, 1932     2 Sheets-Sheet 2
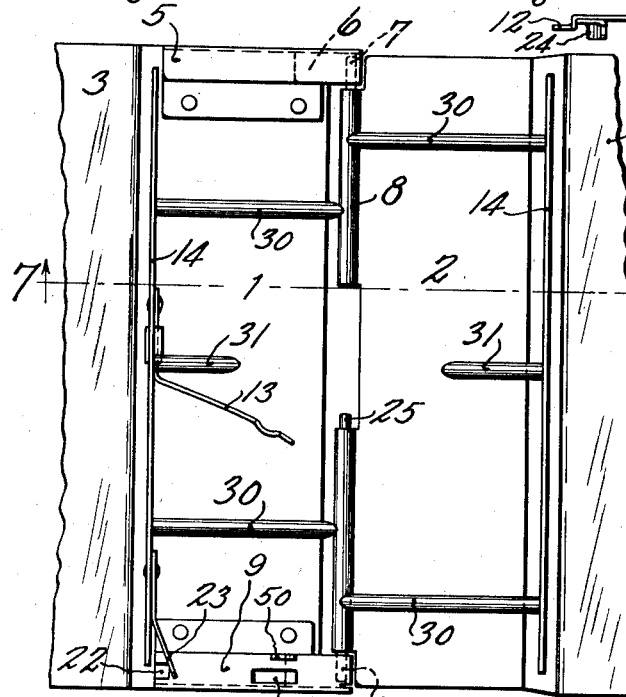
INVENTOR.
JOHN SCHADE
BY
Chapin & Neal
ATTORNEYS.

Patented Apr. 10, 1934

1,954,494

UNITED STATES PATENT OFFICE 1,954,494

LOOSE LEAF BINDER

John Schade, Holyoke, Mass., assignor to National Blank Book Company, Holyoke, Mass., a corporation of Massachusetts Application November 11, 1932, Serial No. 642,137

15 Claims. (Cl. 129—8)

This invention relates to that class of loose leaf binders known as the angle back type in which two telescoping angle members are used, the upright portions of each angle member having posts thereon which pass through the sheets.

This binder is particularly convenient where a large number of sheets and a consequently substantial bulk of filler is used and where it is necessary to conserve space by holding the sheets in compact form when the binder is closed. It has been common practice in binders of this type, when removing or inserting sheets, to open the book at the desired point, separate the two halves of the book and retain a portion of the filler on each angle member. This in many cases has proved somewhat slow and difficult of operation and it is often hard to avoid spilling of the sheets when putting the two halves together again.

While the angle back type of binder has been most desirable from a standpoint of compactness and the conservation of space, it has been open to the serious objection that when the book is open, the sheets do not lie flat and as a consequence it is difficult to write upon them and, when used for catalog or reference purposes, it is hard to read near the inner edge where they are bound together.

In my binder the two angle members are continually in contact and are permitted to break in inverted V-shaped form when pulled apart to the limit of movement. This feature in itself, I am aware, is not new and no invention is claimed thereon but in my structure the arrangement of parts makes for a much smoother operating binder of this type than has heretofore been devised and the binder presents a much neater appearance at the ends; also, when closing the binder after it has been opened for the removal or insertion of sheets, the posts are guided into the holes of the sheet without catching or tearing them.

Some of the objects, therefore, of this invention are to provide a structure wherein, when the book is opened, the sheets will lie substantially flat and which will operate easily and smoothly and which will permit removal or insertion of sheets without danger of spilling, disarranging or tearing them, as well as to provide a structure that is economical to manufacture.

According to other objects of this invention, an angle back type of binder structure of improved form is provided for printed pages to be read in book form. The idea is to make a binder for a thick book, and to make it easy to handle for various conditions of use. One condition is for storing the book in closed form with a minimum bulk, another for opening up the book to reading form with the parts extended beyond the minimum bulk, and another is for positioning the book parts for conveniently rearranging the loose leaf contents by inserts, withdrawals, or other manipulations for the desired book contents to be used in bound form.

The invention is particularly adapted for books such as are put out to the subscribers of business, tax, and legal information, and kept up to date under a service contract. These are printed reference books of large bulk. Quick, convenient access to any desired part of the contents, easy manipulation for reading, and ready changeability of any part of the contents are all important, both for the publisher and subscriber.

In the drawings I show my invention in its preferred form. The construction and mode of operation will be clear from what follows:

Fig. 1 is a bottom end view of the closed book in position for storage;

Fig. 2 is a bottom end view in position for reading;

Fig. 3 is a bottom end view in position for manipulating the loose leaf contents for changes.

Fig. 4 is a plan view of the loose leaf structure fastened on the inside face of the back of the book. It is shown in the extended position corresponding to Fig. 2;

Fig. 4a is a plan view like Fig. 4 but of the lower end only to show the position of parts when the spring pressed latch is pressed inwardly from the position shown in Fig. 4;

Fig. 5 is a plan view like Fig. 4 but corresponding to the book position of Fig. 1, but with cover parts open;

Fig. 6 is a section on line 6—6 of Fig. 5;

Fig. 7 is a section substantially on line 7—7 of Fig. 8 but with the binder in the position corresponding to Fig. 3 for easy removal of the sheets;

Fig. 8 is a detail plan view, like Fig. 4, showing the lower part of the loose leaf structure with the removable parts taken off;

Fig. 9 is an edge view of the latch rod;

Fig. 10 is a section on line 10—10 of Fig. 9;

Figs. 11, 12, and 13 are top, end, and edge views of the spring-pressed keeper for the latch rod;

Fig. 14 is a detail view of a spring mounting;

Fig. 15 is a section on line 15—15 of Fig. 14; and

Fig. 16 is a view of the back end of the book on the outside.

The lose leaf binder shown in the drawings is one made to work conveniently as follows: For storage the parts take the position shown in Fig. 1. For reading they take the position shown in Fig. 2. In this position the book back, which is made of overlapping plates, is extended in width from that necessary for closely packing the contents in storage to that predetermined and increased width desirable for easy reading. In the latter width the sheets are all bound securely on the loose leaf structure but the latter is expanded so as to permit the sheets thereon to have much more room for movement. Thus they can lie out and separate for easy reading as indicated in Fig. 2. The sheets can be turned and read easily from the margin. But they cannot, in the position of Fig. 2, be separated from the binder. Each sheet is locked securely in the binder when positioned as in Fig. 2 just as they are when positioned as in Fig. 1. The shift from one position to the other is accomplished by merely pulling transversely on either or both covers to separate the back portions. When it is desired to shift the arrangement of the sheets, to put in sheets or take them out, the binder back is unlocked by simply pressing in the finger piece at front end of the binder. Both hands are then left free to operate the book and by grasping the right cover and pulling it out gently, the two halves are opened to their maximum position. A slight upward pull on the post with the left hand will then cause the binder to assume the position shown in Fig. 3. When closing the binder after sheets have been rearranged, slip both hands under the two covers near the inner edge, tilt them to a vertical position, and press the book shut.

The improved binder structure by which these desirable results can be accomplished economically and conveniently will now be described.

In the preferred form shown, the binder back has a foundation frame of two overlapping plates 1 and 2, see Fig. 8. Covers 3 and 4 are respectively hinged to these plates. Riveted to the upper edge of plate 1 is a specially formed guide flange 5. Its inside edge view is seen in Fig. 7. It has a channel-shaped cross-section, the bottom leg being riveted to plate 1 and the upper leg overhanging the upper border edge of plate 1. In addition, its upper leg is bent down and backwardly, to provide a third leg 6 (see Fig. 7) which lies between the bottom and top legs of channel 5. The purpose of this arrangement is to provide a guide groove or channel at the upper end of plate 5 to not only receive and guide the upper end of overlapping plate 2, when the parts are pushed together, but to also provide between leg 6 and upper leg 5 a short guide channel for the pintle 7 of a hinge between plates 1 and 2 and used when the back parts are separated to the extent shown in Fig. 7. With regard to this top guide 5, it will be clear (see Figs. 7 and 8) that plate 2 will be guided between the legs of channel 5 until the inner edges of plates 1 and 2 separate. Just before they separate the pintle 7 has entered the guide formed between upper leg 5 and the backwardly bent and spaced end 6. Then as the plates 1 and 2 separate, pintle 7 is guiding the plates to a suitable position for them to "break" the back of the book by the hinging action indicated in Fig. 7. For this purpose the guide 5 is extended beyond the inner edge of plate 1 so as to leave the space shown between plates 1 and 2 for a good hinging action.

Pintle 7 is carried in hinge eye 8. The latter is formed integrally on the upper part of the inner edge of plate 2. This part is tipped upwardly out of the plane of plate 2, see Fig. 7. And when the plates are turned from their parallel position of Fig. 8 to their angular positions of Fig. 7, the inner edge of plate 1 forms a stop against which the bottom side of plate 2 comes to rest so as to hold the plates at a predetermined angular position beyond which they cannot be turned. The advantage of this arrangement is evidenced in Fig. 3 where the binding posts and sheets are positioned for conveniently manipulating the changes in the binder's contents when it is opened up for this purpose.

A similar guide 9 and pintle 10 at the bottom edges of plates 1 and 2 are provided. They guide the plates at their bottom edges by the same construction and in the same manner as that described in connection with the top edges and guides 5, 6 and pintle 7. The guide flange 9 at the bottom is also constructed to cooperate in the functioning of other parts having to do with locking and unlocking the binder.

Referring to Fig. 5, a flat latch rod 11 is mounted on the top of guide 9. It has a rectangular hole 12', the diagonal of which permits the passage of a T-shaped post for assembly. The post holds the rod in position for movements limited by hole 12', transversely of guide 9. The latch rod construction is best shown in Figs. 9 and 10. Its outer end has a tongue 12 that enters loosely in a hole at the end of leaf spring 13 extending transversely of plate 1 from post carrying flange 14. This springs tends to push rod 11 outwardly to the position shown in Figs. 4 and 5. From this position it is pushed inwardly by a finger on flange 15 as indicated in Fig. 4. A flat spring pressed latch 16, the form of which is shown in Figs. 11, 12, and 13, lies in slidable relation on top of guide 9, as shown in Fig. 4. Latch 16 has a depressed tongue 17 at one end to lie in and be guided by the opening 18, see Fig. 8. At the same end an upturned tongue 19 is adapted to slide into and out of registration with a notch 20 at the side edge of latch 11. At the other end of 16 downwardly turned flange 21, see Figs. 12 and 13, is provided. This flange is adapted to ride in the end notch 22 of guide 9, see Fig. 8, and notches on the top side edges of flange 21 engage the sides of notch 22 so as to guide latch 16 at that end. The tongue 17 in opening 18 guides the other end. So the latch 16 is easily assembled and disassembled with guide 9 on the top of which it lies for limited movement. A leaf spring 23, Fig. 8, on the post carrying flange 14 is pivoted so as to have its outer end swung down back of flange 21 on latch 16 after the latter has been put in position on guide 9. This spring tends to move latch 16 toward the latch rod 11. And whenever notch 20 is in line with tongue 19, spring 23 will move latch 16 so tongue 19 will enter notch 20 and hold latch rod 11 against spring 13 and in its inwardly finger pushed position. This position is shown in Fig. 4a.

At the inner end of latch rod 11, on the under side there is a stop flange 24, the shape and position of which are shown in Figs. 9 and 10. The position is such that when the latch rod is in the position of Fig. 5 and the back plates 1 and 2 are pulled outwardly to give the book-reading position of Fig. 2, then the pintle end 25 will always abut the notch 26, Fig. 10, of stop 24 on latch 11.

The advantage of this arrangement is that the stop 24, for limiting the relative sliding of the back plates from storage position (Fig. 1) to reading position (Fig. 2), takes the pressure or shock of the movement close to the transverse center line of the book back. There is less tendency for the binder parts to cramp with the stop located in this position. And it enables one to make a simple, inexpensive structure for the desired efficient operation. It should be noted that while the description of such structure necessarily goes into considerable detail, the structure itself is quite simple and certainly inexpensive for the functions performed.

When it is desired to move the book parts to the sheet changing position of Fig. 3, the user presses with the finger on latch rod end 15, as indicated in Fig. 4. A slight pressure snaps the parts from the positions of Fig. 4 to those of Fig. 4a. The latch 16 automatically holds latch rod 11 in the position of Fig. 4a where it is seen that stop 24 is moved far enough for cooperating pintle end stop 25 to move past stop 24. The book covers and back plates 1 and 2 are then moved to the relative positions of Fig. 8 where there is room for the back to be broken on its hinge formed by pintle ends 7 and 10 which are in the end slots of guides 6 and 9 extended beyond back plate 1. From this position the back is broken and pushed to the position shown in Fig. 7. The plate 1 abuts the plate 2 at 26' to hold the parts rigidly at the desired angle. The eye portions on plate 2 are tipped slightly upward for this purpose of getting the parts in the position of Fig. 7.

The particular covering strips for the back plates 1 and 2 so as to make them blend in good appearance with covers 3 and 4 are not shown because so well understood in this art. But due to the special back construction it is desirable to provide the channel portions 28 and 29, as shown in Fig. 7, for a good appearance at the back of the book. Channel 29 is deeper than channel 28 by about the combined thickness of plate 1 and the bottom flange of the end guide 9. So when the back plates are overlapped, in storage position of Figs. 1 and 6, the outer faces of channels 28 and 29 will be in the same plane. And it is desirable to have them as nearly as possible of the same width. Then when the back of the book is observable, in storage position, see Fig. 14, the appearance of channels 28 and 29 will be substantially the same and be balanced on each side of the outwardly lying plate 1. The latter will form a recessed plane slightly back of channels 28 and 29. The title or other printing matter can be applied on the back plate 1. A slight space 30' between the edge of plane 1 and channel 29 is the only suggestion of a mechanical "break" in the back structure of the book. And this is so slight as not to mar the appearance to any substantial extent. The construction just described lends itself readily to the plan of making up the binding to more nearly resemble a permanently bound book. And for the use in mind this matter of appearance is important.

In Figs. 6 and 7 the constructional details of hinging covers 3 and 4 to the metal parts 28 and 29 are not shown. Any of the well known methods may be used to place such covers in hinged relation at lines 27. Nor is the sheet metal work indicated by which the post carrying flanges 14 are mounted as short upstanding flanges in channels 28 and 29. It is important to have flanges 14 rigidly mounted on the back plates 1 and 2 so as to turn with them rather than with the covers. The plan is to have the posts related to the back plates and for each set of posts to maintain their relation to their own back plates.

Each flange 14, as shown, carries two long posts 30 and one short post 31. The long ones on one flange are as usual arranged in offset relation to the adjacent ones on the other flange and they are of a length about equal to the storage width of the book or one of the back plates. But the short posts 31 are in line with one another. They are short enough so as not to interfere when the book is in storage position as in Fig. 5. When the book is open to the position of Fig. 2 for reading or Fig. 3 for sheet changing, the short posts hold a large number of sheets but not the same number as the long posts. The result is that while many of the sheets are held by three posts from each side, some of them (a comparatively thin pack) are held only by two posts (the long ones) from each side. The result is that the central pack of sheets is not so well held by the post construction as those packs on the outer portions which also engage the short posts. But since the latter packs are so well engaged by the posts they do not get out of arrangement by bowing out at the center and act somewhat like good covers act with relation to the sheets of limited number that have no central support. In other words, the additional post engagements with a thin pack of sheets (that at the central region of the contents) is not so important as with a relatively thick pack of sheets. By my arrangement I can use for example, a sheet punched for five posts and get nearly the same result as if they were punched for six posts. The two short posts use the same line of holes in the sheets while each long post needs an individual line of holes through the filler sheets.

The arrangement just described has a commercial importance in this connection. Many ring book loose leaf binders are used for printed sheets. It is customary for example to have in use by subscribers of printed loose leaf books, ring binders with five rings. The printed sheets are made with five holes to fit these books. With a new type of binder for new subscribers it is desirable to have the printed sheets made so as to fit either the old ring binders or the new post binders. Where the number of rings in the old binders is odd, as 5, the use of two short posts as I have shown fits the situation. And not only does the plan of two short posts fit the particular problem of substitution in a current loose leaf service business, but they actually give a substantially improved result in making a post binder for a thick filler, work better with fewer holes than was formerly possible. For example, it has been customary to jump the construction of a post binder from four to six long posts when the thickness of the filler caused trouble with four. By my construction one can improve the action of the book by making two short posts do most of the work that formerly required long ones and save one line of holes in the filler sheets. This ability to make the thick book work better with the addition of only one hole instead of two in each sheet is important.

Referring to Fig. 6, it will be seen that when plate 2 is pushed in to overlap plate 1, the pintle end 10 will contact flange end 21 of latch 16 and pull tongue 19 (Fig. 4a) out of engagement with notch 20. This permits spring 13 to reset latch 11 and bring stop 24 again in line with pintle 25.

The mere closing of the book and pushing on the covers positions the parts for storage. To read the book it merely needs to be opened and slid by a pull on the cover to reading position with the back expanded. Unless the finger presses on latch rod 11, as in Fig. 4, the book is always prevented from opening beyond its reading position. The unlocking of the book is necessarily a conscious operation. The relocking is automatic as one cannot close the book for storage without unconsciously relocking it. The simplicity of operation in using the book should now be clear.

The manufacture of the book as shown can be carried out in a good many ways. Its economical manufacture is assisted by the plan of making up the covers and their respective back plates with their relatively immovable accessories such as the guide flanges, posts, all in place and then assembling them. The primary assembly (see Fig. 8) may be by driving pintle 7 through its eye 8 with a friction fit. The other pintle the ends of which are shown at 25 and 10 is driven in its eye. The pintle ends 7 and 10 are then canted into guides 5 and 9. Latch rod 11 is placed with the diagonal of its hole 12' over the length of T-stud 50 and turned thereon until it is in position to engage spring 13 at the other end. Latch 16 is merely placed in position. Springs 13 and 23 may be riveted to flange 14 so as to pivot or they may be removably assembled as indicated in Figs. 15 and 14. The ear 40 is stamped up out of flange 14 and a bent end 42 engages hole 41 in the flange. The spring can be readily placed in position and swung down until it engages ear 40 to hold it in place. Its outer end needs to be pressed down to lie against the end flange 21 of latch 16 to constantly press it against the edge of latch rod 11. Spring 13 can be mounted on 14 as spring 23 is and bent to engage the end of latch rod 11.

As described, it will be clear that so far as there is any mechanism in the loose leaf binder all movable parts can be quickly assembled and taken apart with convenient speed.

Having described the invention, the claims for it are:

1. A loose leaf binder comprising a back made of two plates, one slidable on the other to expand and contract the back, a cover hinged at each outside edge of said plates, a hinge connection at each inside corner of one of said plates, guiding means at opposite ends of the other one of said plates, said guiding means extending beyond the edge of its plate to form a cooperating hinge connection with those at said corners of the other plate, upstanding flanges on said plates, one adjacent and parallel to each cover hinge line, posts suspended from said flanges into overlapping relation above and parallel to the back plates.

2. The combination of claim 1 and a movable stop for normally limiting the movement of said plates so as to prevent them from sliding out of overlapping relation.

3. The combination of claim 1 and a movable stop positioned to normally hold said plates from movement to the ends of their guiding means and their hinged positions.

4. A loose leaf binder comprising a cover, a back plate hinged thereto having adjacent the hinge line a relatively short upstanding flange carrying posts to overlie the plate, hinge means mounted to lie above and beyond the outer edge of the plate adjacent the upper and lower ends thereof, a second cover and a back plate hinged thereto also having adjacent its hinge line an upstanding flange carrying posts to overlie the plate, guide means on the upper and lower ends of the latter plate, each adapted to receive a respective hinge means mounted on the first mentioned plate, the ends of said guide means extending beyond the inner edge of the second mentioned plate, said extended guide means forming with the said hinge means a hinged support for the inner edges of the plates when the latter are moved beyond overlapping relation.

5. A loose leaf binder comprising covers and an expansible and contractible back portion, the latter formed by two overlapping relatively slidable plates carrying opposed posts for retaining sheets, cooperating guide means on the upper and lower edges of said plates, a stop positioned between said edges to normally limit the separation of said plates as they move from a normally closed book width to a substantially greater width for reading, means to move said stop for the complete separation of said plates, hinge means connecting the plates for operation when they are separated, whereby the book back may be expanded for reading or hinged into broken position for changing the sheets.

6. In a loose leaf binder of the type having hinged covers and a back made of overlapping plates carrying posts, the combination of cooperating hinge means on the inner edges of the plates operable to break the back of the book so as to position said plates at an angle with their posts turned upwardly for sheet changing purposes, a movable stop to normally stop a sufficient relative movement of the plates between normal book closed position and the position for such hinging action, means to move said stop out of position when the hinged action is desired, whereby the book has three adjustments for back width, namely, normally closed width, a larger reading width, and still larger hinging width.

7. The combination of claim 6 in which said stop is located close to the transverse center line of the book.

8. In a post type loose leaf binder to hold printed sheets for reading, a loose leaf structure for the back of the book comprising two plates adapted to overlap and each substantially of the same width as the book back, each plate having an upstanding flange to hold the posts, hinge eyes arranged along the inside edge of one plate and bent upwardly and outwardly from such edge, pintle means in said eyes, guide means at the upper and lower edges of the other plate to guide the plate edges in their relative movements, said guide means being extended beyond the inner edge of their plate to also guide the pintle means when the plates are pulled apart, said guide extensions formed to cooperate with said pintle means to form a hinge for the separated plates.

9. The combination of claim 8 and a latch bar arranged along the inner edge of one plate having a stop to engage a part on the other plate to limit their separating movement.

10. The combination of claim 8 and a stop carried by one plate in line with pintle means at about the transverse center line of the book and near the edge thereof, means to move said stop out of said line to render it inoperative, spring pressed means to return said stop to normal position and a movable keeper operable to hold the stop out of said line.

11. The combination of claim 8 and a stop carried by one plate in line with pintle means at about the transverse center line of the book and near the edge thereof, means to move said stop out of said line to render it inoperative, spring pressed means to return said stop to normal position and a movable keeper operable to hold the stop out of said line, and automatic means to move the keeper out of holding position for the latch, said automatic means being operable upon sliding said plates to their full overlapping condition.

12. In a loose leaf binder of the type having post carrying means at the back, an odd number of pairs of sheet carrying posts on said means, an even number of said pairs being made up of adjacent long posts in offset and overlapping relation to serve adjacent holes in the punched filler sheets from opposite sides of the binder and a single pair of short posts, one on each side of the binder and in line with one another to serve the same holes from either side of the punched sheets, said short posts being located midway of the pairs of long posts.

13. A loose leaf binder comprising a cover hinged to a back portion, the latter being made up of an angle plate one leg of which is along the hinge line and shorter than the other leg which extends over the back of the book, a guide member along the upper edge of the back plate, said guide member formed of a stamping with a flange overlying the top edge and having a bent back end portion between said flange and its back plate for a portion of its length, a second guide member of like construction along the lower edge of the back plate, a latch mounted to slide on the top of the second guide member, a leaf spring to press said latch toward the inner end of its guide member, a latch rod mounted transversely of the second guide member and extending to about the transverse center line of the binder, a spring at such center line to press the latch rod outwardly, a guide slot and post for the latch rod to limit such movement, a second cover and an angle plate of the same kind as the first mentioned one, said plate having along its inner edge a pair of upwardly and outwardly extending hinge eyes, pintles therein some of which cooperate with the bent back end portions of said guide members to form hinges for the angle plates when separated and a stop on said latch rod in line with one of said pintles at the center of the book back to prevent the parts being separated for hinging position, a finger piece to move the latch rod and stop out of stopping position, said spring latch automatically operating to hold the latch rod in the last named position, one of said pintles being in line with said latch to push it into releasing position when the book back is moved with its parts in fully overlapping position.

14. In a loose leaf binder of the type in which the back is made of loose leaf structure having overlapped plates for expansion and contraction and carrying posts to hold book contents of punched sheets, the combination of means to guide the plates in overlapping relation, a movable stop to normally limit the separating movement of the plates short of separating position, cooperating hinge parts on the plates operable as hinges only when the plates are separated beyond the stop limit, a finger operated latch bar to move the stop out of limiting position, a spring to move it back to limiting position, a latch keeper automatically operable to hold the latch bar in said finger operated position, means operable only upon return of the plates to fully overlapping position to release said latch keeper and permit the stop to return to normal position, said plates being normally free to move from fully overlapped position to a separated position limited by said stop, said hinges being operable to break the back of the book for changing contents when the plates are moved far enough apart beyond the stop position to bring the cooperating hinge members together, whereby the binder is adapted for quick movement from fully overlapped back plate position for storage with a minimum bulk, to separated position limited by the movable stop for easy reading, and to back plate hinged position for changing contents.

15. An extensible back loose leaf binder, made of overlapping plates, guide members for the plates arranged at the top and bottom edges thereof, said guide members having extensions beyond the inside edges of the plates, said extensions forming hinge members for the plates to turn when their inside edges are separated, and a spring pressed stop member positioned at the inner edge of one plate to engage a part at the inside edge of the other plate to normally prevent separation of the plates, a keeper for said stop to hold it out of normal position and a member operable to move said keeper out of position when desired so that the stop member may return to normal position.

JOHN SCHADE.